US006073703A

United States Patent [19]

Jeon et al.

[11] Patent Number: 6,073,703

[45] Date of Patent: Jun. 13, 2000

[54] PIN ROTATING TOOL AND METHOD

[76] Inventors: Myoung-Soo Jeon, 1102 Kwanak Hyundai, Apt. 128-1901, Kyounggi-do, Anyung-si, Dongan-gu, Buheung-dong; Young Pyo Hong, 240-4, Kyounggi-do, Kunpo-si, Sanbon-dong; Song Hoon Ahn, Wosung Apt. 5-1007, Kyounggi-do, Ansan-si, Bono-dong, all of Rep. of Korea

[21] Appl. No.: 09/002,038

[22] Filed: Dec. 31, 1997

[51] Int. Cl.[7] .................................................. B23Q 5/04

[52] U.S. Cl. ............................ 173/1; 173/164; 173/214

[58] Field of Search ............................ 173/1, 104, 164, 173/213, 214, 217, 216

[56] References Cited

U.S. PATENT DOCUMENTS

| | | | |
|---|---|---|---|
| 3,134,276 | 5/1964 | Abrams | 173/214 |
| 3,870,110 | 3/1975 | Richmond et al. | 173/213 |
| 4,898,251 | 2/1990 | Clark et al. | 173/164 |
| 4,995,296 | 2/1991 | Chen | 173/164 |
| 5,524,713 | 6/1996 | Lange | 173/213 |

*Primary Examiner*—Scott A. Smith
*Attorney, Agent, or Firm*—Long, Aldridge & Norman

[57] ABSTRACT

A tool for rotating a pin and a method of rotating a pin are disclosed. The tool includes a front support, a rear support, a side wall connected to the front support and the rear support, a moving member contacting the side wall and moveable relative to the front and rear supports, the moving member including a portion defining a slot and a projection extending into the slot, and a screw connected to the moving member so as to permit movement of the screw relative to the front and rear supports and the moving member. The screw has an external surface and an end, the screw including a slot defined in the end and a groove along the external surface, wherein the projection on the moving member engages the groove on the screw, the screw rotates as the moving member moves, and a pin that inserted in the slot of the screw rotates with the screw. The pin may be connected to an electrical connector after rotation.

17 Claims, 5 Drawing Sheets

PIN ROTATING TOOL AND METHOD

BACKGROUND OF THE INVENTION

1. Field of the Invention

The following invention is directed to a tool for assembling a connector, and more particularly, to a tool which allows a pin to be selectively rotated before installation in a connector.

2. Description of the Related Art

Conventional tools, for assembling a connector suffer from several disadvantages. Conventional tools are cumbersome and difficult to operate. The tools do not provide the flexibility desired during the assembly of a connector. Many tools permit only a single pin to be installed on a connector. Further, some conventional tools do not allow a pin to be selectively rotated and some do not allow multiple pins to be rotated with respect to one another.

SUMMARY OF THE INVENTION

Accordingly, the present invention is directed to a pin rotating tool that substantially obviates ore or more of the disadvantages of the related art.

An object of the present invention is to provide a pin rotating tool that is easy to operate.

Another object of the present invention is to provide a pin rotating tool that is easily and economically manufactured.

Another object of the present invention is to provide a pin rotating tool that allows a single pin to be rotated.

Another object of the present invention is to provide a pin rotating tool that allows several pins to be rotated simultaneously.

Another object of the present invention is to provide a pin rotating tool that allows pins to be rotated with different orientations.

Another object of the present invention is to provide a pin rotating tool that allows pins to be rotated at different speeds.

Yet another object of the present invention is to provide a pin rotating tool that may be used in a manufacturing machine.

Additional features and advantages of the invention will be set forth in the description which follows, and in part will be apparent from the description, or may be learned by practice of the invention. The objectives and other advantages of the invention will be realized and attained by the structure particularly pointed out in the written description and claims as well as the appended drawings.

To achieve these and other advantages and in accordance with the purposes of the present invention, as embodied and broadly described, the present invention includes a tool for rotating a pin. The tool includes a front support, a rear support, a side wall connected to the front support and the rear support, a moving member contacting the side wall and moveable relative to the front and rear supports, the moving member including a portion defining a slot and a projection extending into the slot, and a screw connected to the moving member so as to permit movement of the screw relative to the front and rear supports and the moving member. The screw has an external surface and an end, the screw including a slot defined in the end and a groove along the external surface, wherein the projection on the moving member engages the groove on the screw, the screw rotates as the moving member moves, and a pin that inserted in the slot of the screw rotates with the screw.

To achieve these and other advantages and in accordance with the purposes of the present invention, as embodied and broadly described, the present invention also includes a method of rotating a pin comprising the steps of providing a pin rotating tool including a moving member and at least one screw having an external surface and an end, the screw including a slot defined in the end and a groove along the external surface, providing a moving member actuator connected to the moving member, inserting a pin into the slot of the screw, actuating the moving member actuator to move the moving member, wherein the lead screw is rotated to orient the pin to a desired orientation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In accordance with the objects of the present invention, the manufacturing machine includes a pin rotating tool having a screw that is used to rotate a pin to a desired orientation before the pin is attached to an electrical connector. A manufacturing machine may include several pin rotating tools, each of which may include several screws. Preferably, the number of screws and pin rotating tools corresponds to the number of pins to be attached to connectors.

As will be discussed below, the pin rotating tool may rotate a pin to any desired angle with respect to a horizontal plane. It is contemplated that the pins may be rotated and attached to a connector in such a manner so that four pins contact a single prong on the connector. Such an assembly increases the surface area of the contact between the pins and the connector and reduces the required overall size of the connector.

Figure 1:
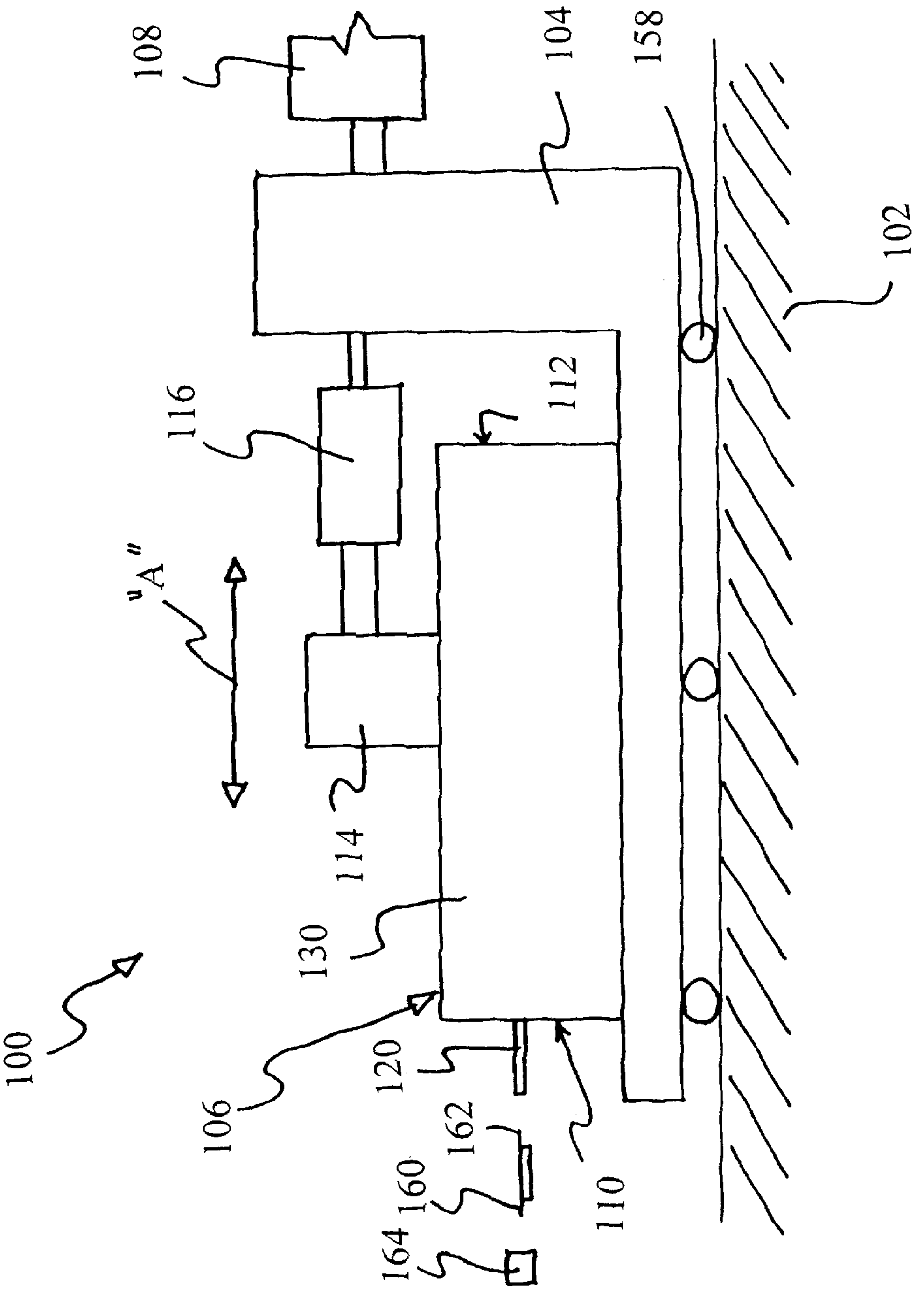
FIG. 1 is a side view of the manufacturing machine according to a preferred embodiment of the present invention.

Turning now to the specific preferred embodiments, FIG. 1 shows a manufacturing machine 100 that operates in relation to a ground 102. The ground 102 could also be a work surface. The manufacturing machine 100 preferably includes a sled 104 that can move with respect to ground 102 using wheels 158 or any other suitable device. Sled 104 is moved by a sled actuator 108. The sled actuator 108 can be any suitable device capable of moving sled 104. The preferred embodiment of the sled actuator 108 contemplates the use of a pneumatic cylinder.

The manufacturing machine 100 includes a pin rotating tool 106 that is mounted to sled 104. The pin rotating tool 106 includes a front support 110, a rear support 112, a moving member 114, and side walls 130. The pin rotating tool 106 also includes at least one lead screw 120.

Preferably, the moving member 114 moves with respect to the front and rear supports 110, 112, and the side walls 130. Also, the moving member 114 may move with respect to the sled 104. The moving member 114 is moved by a moving member actuator 116. The moving member actuator 116 may be any suitable device capable of moving the moving member 114. The preferred embodiment of the moving member actuator 116 contemplates the use of a pneumatic cylinder.

The moving member actuator 116 may be attached to a device (not shown) independent of sled 104, or it may be attached to the sled 104 itself. The attachment of the moving member actuator 116 to an independent device or to the sled 104 is based on whether relevant or absolute positioning of the moving member 114 is desired. The preferred embodiment contemplates the attachment of the moving member actuator 116 to the sled 104.

Figure 2:
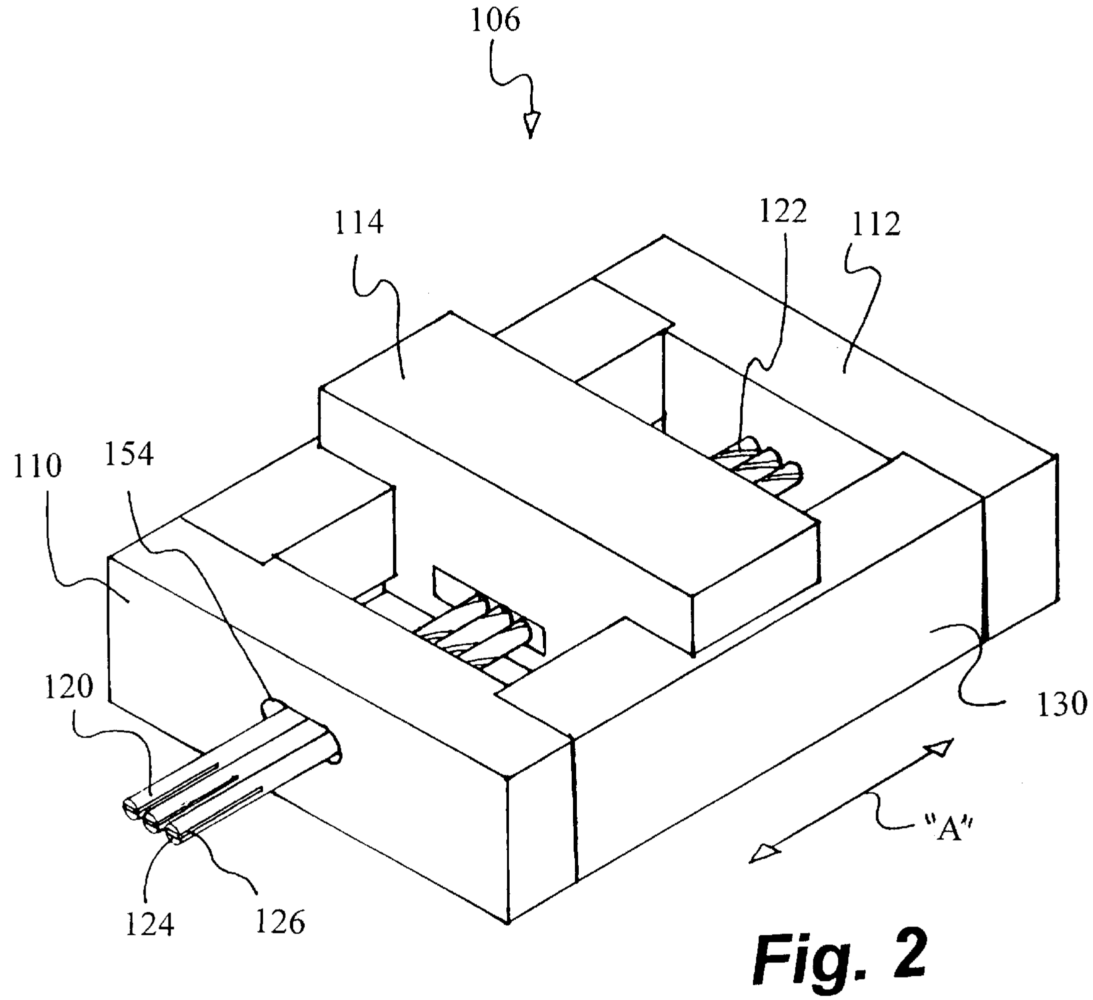
FIG. 2 is a perspective view of a pin rotating tool according to a preferred embodiment of the present invention.
Figure 3:
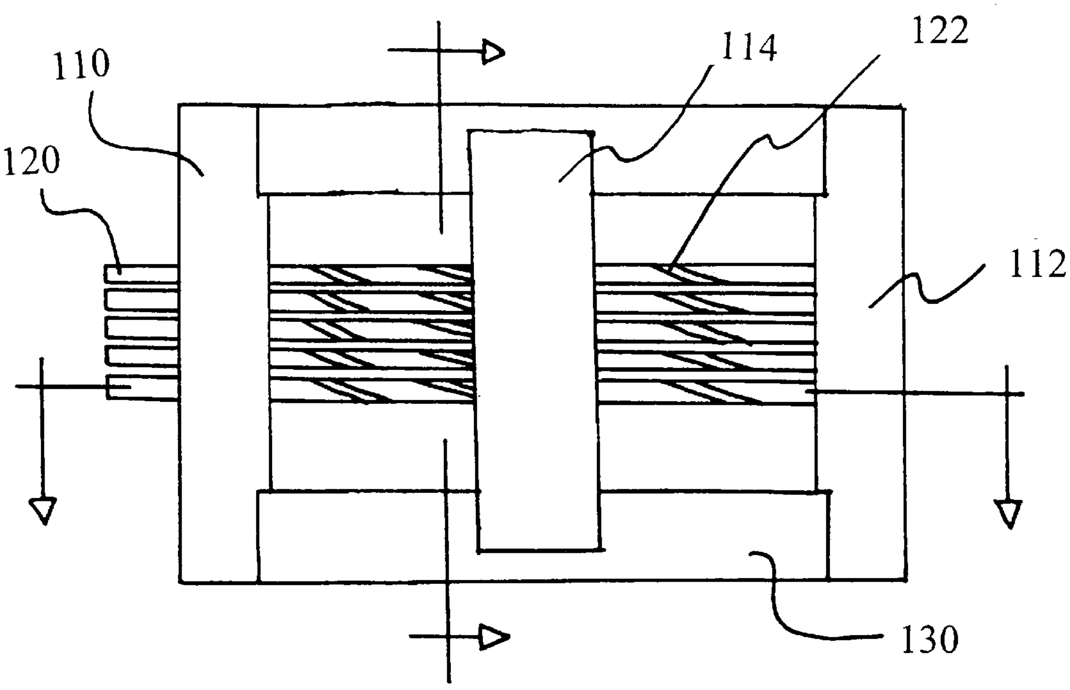
FIG. 3 is a top view of the pin rotating tool as shown in FIG. 2.

Referring to FIGS. 1–3, the preferred embodiment of the pin rotating tool 106 of the invention is shown. The pin rotating tool 106 includes a moving member 114 that is moved by moving member actuator 116. The moving member 114 is moved in the directions of arrow "A" on FIGS. 1 and 2. Portions of the moving member 114 slide along the upper surfaces of the side walls 130 which provide support for the moving member 114.

The preferred embodiment of the invention contemplates the use of at least one lead screw 120 in the pin rotating tool 106. A lead screw 120 extends out from the front support 110 of the pin rotating tool 106. Each lead screw 120 includes an end 124 that defines a slot 126. (See FIG. 2.) The pin 160 to be attached to connector 164 has an end 162 that is inserted into slot 126. The slot 126 axially extends along the lead screw 120 a sufficient distance to accommodate the end 162 of the pin 160. The pin 160 may be slid horizontally or vertically in slot 126. Also, the pin 160 may be slid into slot 126 by a machine (not shown) or manually. Preferably, the pin 160 is slid horizontally into slot 126 by a machine.

Once the pin 160 is mounted on the lead screw 120, the moving member actuator 116 is operated to move the moving member 114. Depending on its initial position, the moving member 114 is moved either toward or away from the front support 110.

Each lead screw 120 has at least one groove 122 on its external surface. The moving member 114 has a projection 134, which will be described in more detail later, that corresponds to a groove 122 on the lead screw 120. The projection 134 engages the groove 122 and when the moving member 1 14 is moved, the lead screw 120 is rotated. Accordingly, after the rotation, the slot 126 may be at a different orientation with respect to a horizontal plane than it was when the pin 160 was initially mounted. Thus, a desired orientation of the pin 160 may be achieved with the knowledge of the initial orientation of the slot 126, the pitch of the groove 126 on the lead screw 120, and the distance the moving member 114 travels.

Turning now to the mounting of a lead screw 120, the preferred embodiment of the invention contemplates the use of at least one lead screw 120. While different Figures show different quantities of lead screws 120 in the pin rotating tool 106, the quantity in a pin rotating tool 106 may be any appropriate number that corresponds to the number of pins 160 to be rotated. Preferably, each pin rotating tool 106 includes lead screws 120.

Referring to FIGS. 2–5, the connection between the rotating tool 106 and a lead screw 120 is shown. Since the preferred connection of each lead screw 120 is similar, only one such connection will be discussed to simplify the description. Each lead screw 120 includes several portions 142A, 142B, 142C that have different diameters. (See FIG. 5.) The first portion 142A of the lead screw includes the end 124 with the slot 126. The front support 110 includes a bore 136 through which the first portion 142A passes. The diameter of bore 136 should be sized to allow rotational movement of the lead screw 120. The front support 110 also includes a slot 154 which provides clearance around the lead screws 120. The first portion 142A extends out from the front support 110.

Each lead screw 120 includes a second portion 142B with a larger diameter than that of the first portion 142A. The larger diameter prevents the lead screw 120 from sliding through bore 136 and becoming separated from the pin rotating tool 106. The second portion 142B passes through a slot 132 formed in the moving member 114. (See FIG. 4.)

Finally, each lead screw 120 includes a third portion 142C with a diameter corresponding to that of a bore 140 defined in the rear support 112. The slot 132 and bore 140 are sized to permit rotation of the lead screw 120 relative to the moving member 114 and the rear support 112, respectively.

Figure 4:
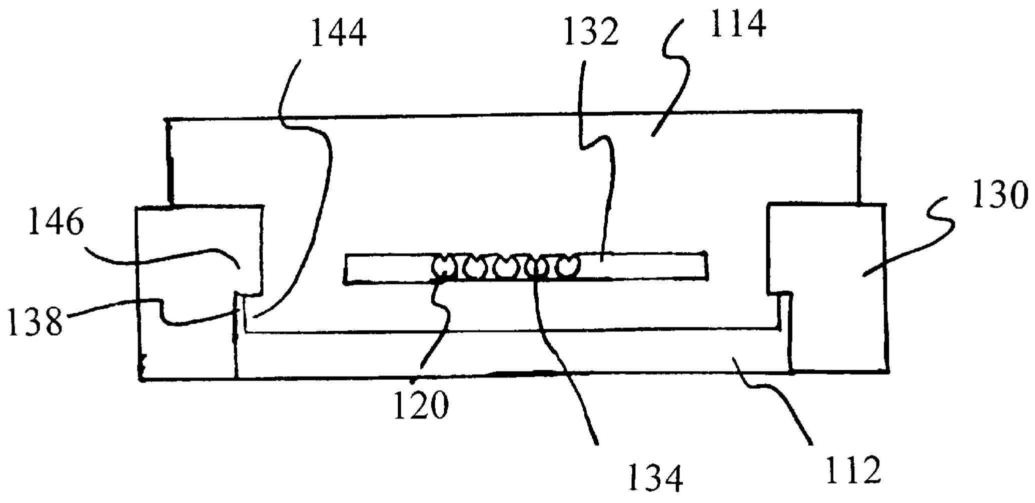
FIG. 4 is a cross-sectional view taken along line 4—4 of FIG. 3.

Turning to the rotation of a lead screw 120, the connection between the moving member 114 and a lead screw 120 is shown in FIG. 4. The moving member 114 includes a portion defining a slot 132. The moving member 114 also includes a projection 134 that extends into the slot 132. Preferably, the quantity of projections 134 corresponds to the quantity of lead screws 120. Each projection 134 engages a groove 122 on a lead screw 120. While there may be more than one groove 132 on a lead screw 120, only one projection 134 per lead screw 120 is preferred.

Each groove 122 wraps around the lead screw 120 along its external surface. As the moving member 114 moves toward and away from the front support 110, the projection 134 moves as well. Since the projection 134 is engaged with the groove 122, the lead screw 120 is rotated about its longitudinal axis when the moving member 114 moves. The amount of rotation of the lead screw 120 depends on several factors, as discussed above. One of the factors is the pitch of the groove 122 as measured along the lead screw 120, as will be discussed later.

Turning to the assembly of the pin rotating tool 106, the connection of the parts of the preferred embodiment is easy and simple. Initially, the first portion 142A of a lead screw 120 is inserted into a bore 136 in the front support 110 until the second portion 142B of the lead screw 120 contacts the front support 110. Next, the side walls 130 are connected to the front support 110. The front support 110 and the side walls 130 are secured by connectors (not shown). Preferably, bolts are used as the connectors, however, any suitable type of mechanical connector or adhesive may be used.

Next, the moving member 114 is slid onto the side walls 130 and the lead screws 120. Each side wall 130 includes a shoulder 146 defining an indentation 138 into which the lip 144 of the moving member 114 fits. The engagement of the lip 144 and the indentation 138 prevents the moving member 114 from separating away from the side walls 130 in a vertical direction. At the same time, the projections 134 on the moving member 114 are aligned with the grooves 122 on the lead screws 120. Once the moving member 114 is mounted, the rear support 112 is connected to the side walls 130 in the same manner that of the front support 110. Also, the third portion 142C of the lead screw 120 is inserted into bore 140 of the rear support 112.

Figure 7:
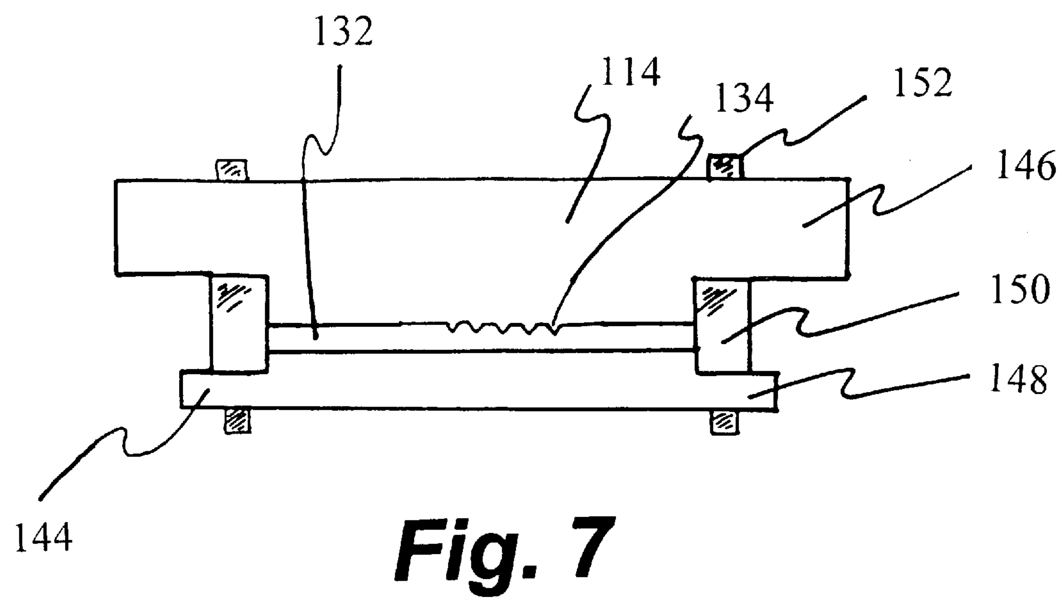
FIG. 7 is a front view of the moving member according to a preferred embodiment of the present invention.

It is noted that the moving member 114 may be one piece or may comprise several pieces. The two embodiments of the moving member 114 are shown in FIGS. 4 and 7. FIG. 4 shows a one-piece moving member 114. FIG. 7 shows a multi-piece moving member 114. The preferred embodiment of the invention includes the multi-piece moving member 114.

As shown in FIG. 7, the moving member 114 includes an upper member 146, a lower member 148, and side members 150. The upper, lower, and side members are connected by bolts 152. While the preferred embodiment uses bolts, any suitable connectors or adhesives may be used to connect the members of the moving member 114 together.

Preferably, the various parts of the invention discussed above are made from metal. However, any suitable material may be used.

Turning now to other operations and embodiments of the pin rotating tool 106, several arrangements of the lead screws 120 are contemplated by the invention. The final orientation of the pin 160 after it has been rotated may be varied by changing the initial orientation of the slot 126 and by changing the pitch of the groove 122 on the lead screw 120. These two factors are changed in the several embodiments discussed below.

Figure 6A:
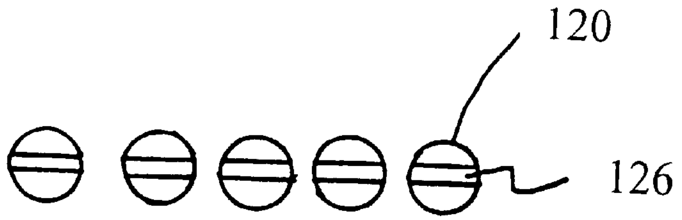
FIG. 6A is a front view of several screws according to a preferred embodiment of the present invention.

The first and preferred embodiment is shown in FIGS. 2, 3, and 6A. The slot 126 on each lead screw 120 is at the same orientation with respect to a horizontal plane as the other slots 126 on the other lead screws 120. (See FIG. 6A.) Further, the grooves 122 on the lead screws 120 are identical and in the same pitch as each other. The same orientation and same pitch ensures that the lead screws 120 will rotate at the same speed and the pins will be oriented in the same manner no matter how much they rotate.

Figure 6B:
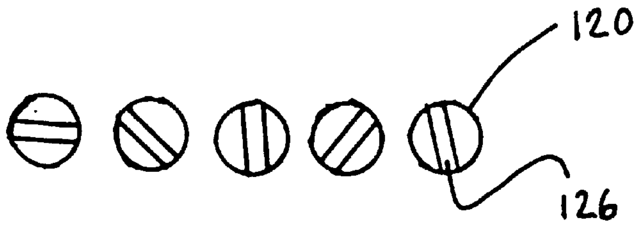
FIG. 6B is a front view of several screws according to another embodiment of the present invention.
Figure 5:
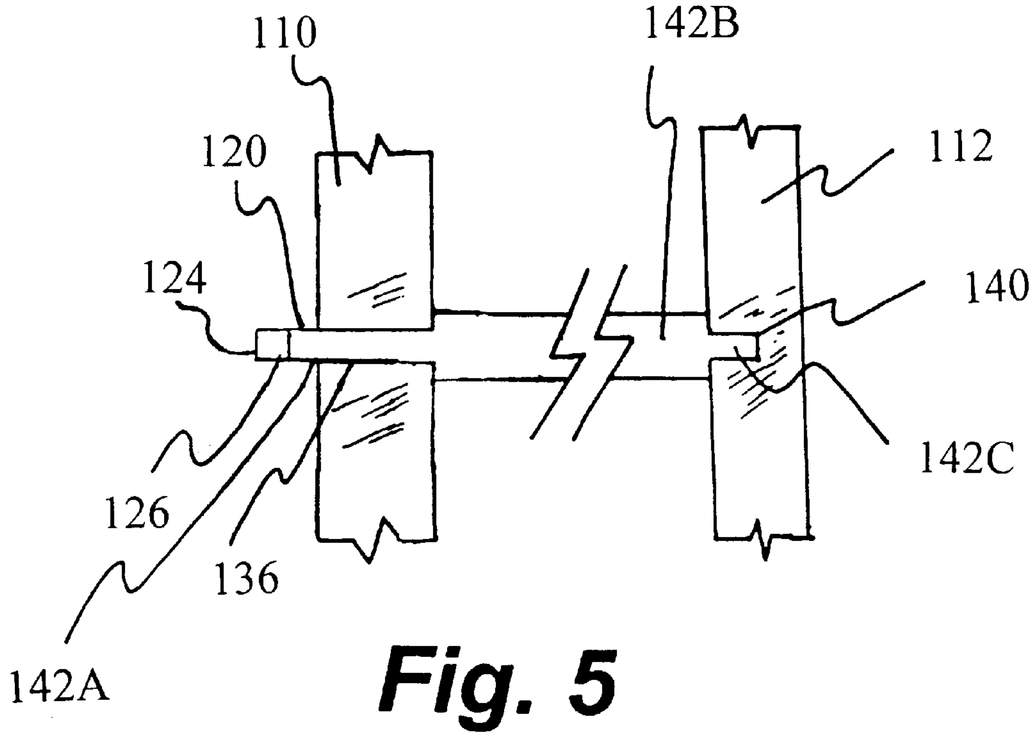
FIG. 5 is a cross-sectional view taken along line 5—5 of FIG. 3.

Another embodiment contemplated by this invention uses a different orientation of the slots 126 with the same pitch for the grooves 122 of the lead screws 120. The lead screw arrangement includes slots 126 on the lead screws 120 initially at different angles with respect to a horizontal plane. This arrangement is shown in FIG. 6B. In this embodiment, the grooves 126 of different lead screws 120 have the same pitch. Thus, the lead screws 120 will rotate at the same speed, but the pins 160 in the slots 126 will not be aligned after they are rotated since the slots 126 were not initially aligned.

Figure 8:
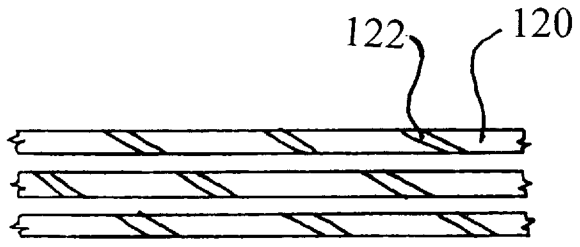
FIG. 8 is a top view of lead screws according to an alternative embodiment of the present invention.

Another embodiment of the invention contemplates varying the pitch of the grooves 122 only. The slots 126 on the lead screws 120 are initially aligned. However, the pitch of the grooves 122 on the lead screws 120 are different from each other as shown in FIG. 8. As a result, when the moving member 114 is moved, the lead screws 120 will rotate at different speeds because the grooves 122 are different. Accordingly, the pins 160 may or may not be aligned after they are rotated.

Yet another embodiment of the invention contemplates varying both the orientation and the pitch. This arrangement of the lead screws 120 uses slots 126 which are not initially aligned (see FIG. 6B) and grooves 122 which do not have the same pitch as each other. In this embodiment, the lead screws 120 will rotate at different speeds when the moving member moves. Also, since the slots 126 are not initially aligned, they may or may not be aligned after the lead screws 120 are rotated.

Any of the features of the invention disclosed can be used separately, or the features of the present invention can be combined and used together.

It will be apparent to those skilled in the art that various modifications and variations can be made to the pin rotating tool of the present invention without departing from the spirit or scope of the invention. Thus, it is intended that the present invention cover the modifications and variations of this invention provided they come within the scope of the appended claims and their equivalents.

We claim:

1. A method of rotating a pin comprising the steps of:

providing a pin rotating tool including a moving member and a first screw having an external surface and an end, the first screw including a slot defined in the end and a groove along the external surface;

providing a moving member actuator connected to the moving member;

inserting a pin into the slot of the first screw;

actuating the moving member actuator to move the moving member, wherein the first screw is rotated to orient the pin to a desired orientation.

2. The method as recited in claim 1, further comprising the steps of:

providing a second screw in the pin rotating tool, the second screw including a slot defined in the end and ; groove along the external surface.

3. The method as recited in claim 2, wherein the first and second screws are rotated at the same speed.

4. The method as recited in claim 2, wherein the first screw is rotated at a different speed than the second screw.

5. The method as recited in claim 2, wherein the slot on the first screw is oriented at the same angle with respect to a horizontal plane as the slot on the second screw before rotation.

6. The method as recited in claim 2, wherein the slot on the first screw is oriented at different angle with respect to a horizontal plane than the slot on the second screw before rotation.

7. A tool for rotating a pin comprising:

a front support;

a rear support;

a side wall connected to the front support and the rear support;

a moving member contacting the side wall and moveable relative to the front and rear supports, the moving member including a portion defining a slot and a projection extending into the slot; and a screw connected to the moving member adapted to permit movement of a screw relative to the front and rear supports and the moving member, the screw having an external surface and an end, the screw including a slot defined in the end and a groove along the external surface, wherein the projection on the moving member engages the groove on the screw, causing the screw to rotate as the moving member moves, and the slot adapted to accommodate a pin which rotates with the screw.

8. The tool as recited in claim 7, wherein the side wall includes a shoulder defining an indentation, and the moving member includes a lip that engages the indentation when the moving member contacts the side wall.

9. The tool as recited in claim 7, further comprising:

at least two screws connected to the moving member.

10. The tool as recited in claim 9, wherein the at least two screws are connected to the front support and the rear support.

11. The tool as recited in claim 9, wherein each screw includes an external surface and an end, a slot defined in the end, and a groove along the external surface of the screw.

12. The tool as recited in claim 11, wherein the slot on each screw is oriented at the same angle with respect to a horizontal plane as the slots on other screws.

13. The tool as recited in claim 12, wherein the groove on each screw has the same pitch as the groove on other screws.

14. The tool as recited in claim 11, wherein the slot on at least one screw is oriented at different angle with respect to a horizontal plane as a slot on another screw.

15. The tool as recited in claim 14, wherein the groove on a screw has a different pitch as the groove on another screw.

16. The tool as recited in claim 11, wherein the groove on each screw has the same pitch as the groove on other screws.

17. The tool as recited in claim 11, wherein the groove on a screw has a different pitch as the groove on another screw.

* * * * *